UNITED STATES PATENT OFFICE.

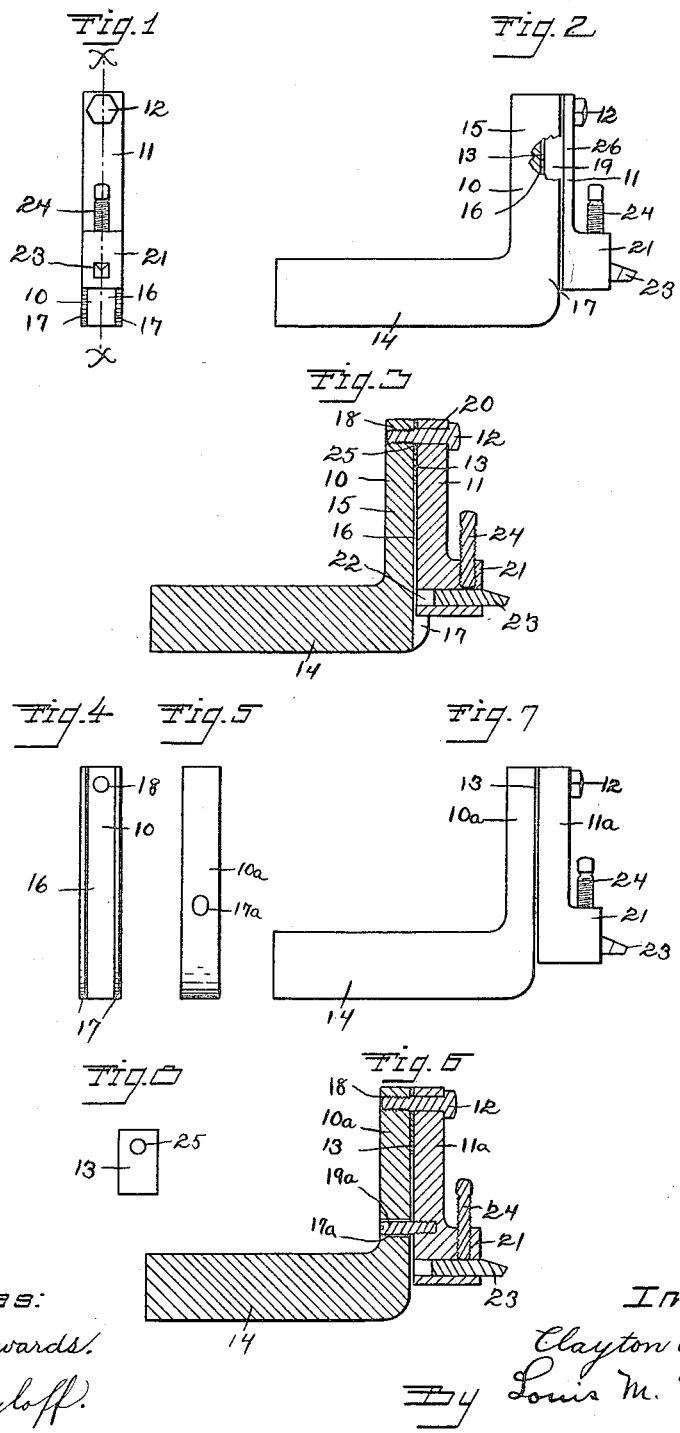

CLAYTON B. SECHREST, OF NEW BRITAIN, CONNECTICUT.

TOOL-HOLDER.

1,140,772.  Specification of Letters Patent.  Patented May 25, 1915.

Application filed July 16, 1914. Serial No. 851,368.

*To all whom it may concern:*

Be it known that I, CLAYTON B. SECHREST, a citizen of the United States, residing at New Britain, in the county of Hartford and State of Connecticut, have invented certain new and useful Improvements in Tool-Holders, of which the following is a specification.

My invention relates to improvements in tool holders, and the object of my improvement is simplicity and economy in construction and convenience and efficiency in use.

In the accompanying drawing:—Figure 1 is a front elevation of my improved tool holder. Fig. 2 is a side elevation of the same. Fig. 3 is a sectional view on the line $xx$ of Fig. 1. Fig. 4 is a front elevation of the shank member. Fig. 5 is a front elevation of a modification of the shank member of my tool holder. Fig. 6 is a sectional view of the complete tool composed in part of the modification of the shank member shown in Fig. 5. Fig. 7 is a side elevation of the same. Fig. 8 is a front elevation of the spacing member shown in Fig. 3.

My improved tool holder comprises a shank member 10 and a tool member 11 mounted thereon by means of a screw 12, and spaced therefrom for the major part of the length by a spacing member 13. The shank member 10 comprises a rearwardly directed shank 14 suitable for engaging with the tool post of a lathe and an upwardly directed arm 15 on the front end thereof. On the front face of the arm 15 and extending continuously across the front end of the shank 14 is a groove 16, flanked on the sides by parallel ribs 17. At the upper end of the arm 15 is a threaded hole 18 for the screw 12. The opposed faces of the ribs 17 are plane and parallel.

The tool member 11 has on the rear face a rib 19 extending the entire length thereof, which fits between the ribs 17 on the shank member, and the front portion is of a width to cover the lateral ribs 17. At the upper end there is a hole 20 fitting the body of the screw 12.

I prefer to have the tool member 11 of sufficient length to extend along the length of the arm 15 and below the same so that the lower end will be in line with the shank 14. At the said lower end is the tool holding head 21, provided with a horizontal slot 22 fitting the tool 23 and a securing screw 24 for securing the tool 23 therein.

The spacing member 13 fits in the slot 16, has a hole 25 for the screw 12, and as shown is positioned between the bottom of the said slot and the rib 19, and is of such length as to extend appreciably below the screw 12. Accordingly, the spacing member 13 serves to space the tool member 11 from the shank member 10, and the thickness thereof will be made to correspond to the amount of spacing of the said members that is desired.

Clearance is provided between the front faces of the lateral ribs 17 and the overhanging portions 26 of the tool member 11 by making the central rib 19 of proper depth, so that in use the lower portion or tool head 21 of the tool holder 11 may spring inwardly, responsive to excessive pressure at the cutting point of the tool 23.

It will be noted that in such movements the tool member 11 is positively guided by reason of the engagement of the central rib 19 with the lateral ribs 17. The guiding feature of the said ribs also permits of removing the tool member 11 for any purpose desired and replacing the same in precisely the same relative position as before removed. Such removal and replacement are readily effected by manipulating the screw 12.

The amount of spring obtainable is determined by the thickness of the spacing member 13, as already explained, and also by the length of the same, as the lower end thereof serves as the limit of free movement, or the fulcrum, so that lengthening the spacing member will reduce the permitted free movement.

For effecting the guiding of the tool member relatively to the shank members any other suitable form of engaging ways may be provided. For instance in the modification shown in Figs. 6 and 7 there is a pin or screw 19$^a$ in the tool member 11$^a$ engaged with a slot 17$^a$ in the shank member 10$^a$. In this case the opposed faces of the tool member 11$^a$ and the shank member 10$^a$ are finished plane.

In use the tool holder described has certain features common to tool holders of the goose neck type, having in fact, all the advantages of such a tool holder, and is superior thereto from a production standpoint and also because of the facility with which the parts may be separated and reassembled, and changes made in the working conditions. Furthermore, in some cases different tool holders may be used with the same shank member.

The facility of separating and reassembling the parts referred to above applies regardless as to whether or not a spacing member is used, as where the resiliency or spring feature is not required. That is to say, in any case whether spaced or not, the tool holder can be removed for grinding the tool and replaced in proper operative position, and the function of the guiding feature for guiding the parts is essentially restricted to prevent lateral displacement.

What I claim as my invention is:—

1. A tool holder comprising a shank member having a shank and an arm at one end thereof, and a tool member having a tool at one end, means for securing the other end of the said tool member to the free end of the said arm, and means separate from the said last named means for guiding the said tool member relatively to the said shank.

2. In a tool holder comprising a shank member and a tool member separably mounted thereon, the said shank member comprising a shank and an arm extending upwardly from the free end thereof, the said tool member extending along adjacent the front face of the said arm and having a tool head at the lower end, a spacing member positioned between the upper ends of the said arm and tool member, a screw securing the said upper ends and spacing member, and means for guiding the lower end of the said tool member relatively to the said shank member.

3. A tool holder comprising a shank member having a shank and an arm at one end thereof, and a tool member having means for holding a tool at one end, means for securing the other end of the said tool member to the free end of the said arm so that the major portion of the said tool member will be in spaced relation to the said shank member, and means for guiding the said major portion relatively to the said shank member in movements responsive to pressure on the said tool member.

4. A tool holder comprising a shank member having a shank and an arm positioned at one end thereof and having a free end, and a tool member extending along the outer face of the said arm and having means for holding a tool at one end, the other end of the said tool member being secured to the said free end of the arm, and means for guiding the other portions of the said tool member laterally relatively to the said arm, and permitting freely relative movement thereof in the direction of the said shank.

CLAYTON B. SECHREST.

Witnesses:
 BENJAMIN LAMB,
 LOUIS M. SCHMIDT.

Copies of this patent may be obtained for five cents each, by addressing the "Commissioner of Patents, Washington, D. C."